(12) United States Patent
Dorneich et al.

(10) Patent No.: US 10,707,920 B2
(45) Date of Patent: Jul. 7, 2020

(54) SENSOR APPARATUS, SENSOR SYSTEM, AND METHOD FOR OPERATING A SENSOR APPARATUS

(71) Applicant: BALLUFF GmbH, Neuhausen (DE)

(72) Inventors: Albert Dorneich, Ostfildern (DE); Roland Schaefer, Rottweil (DE)

(73) Assignee: BALLUFF GmbH, Neuhausen (DE)

( * ) Notice: Subject to any disclaimer, the term of this patent is extended or adjusted under 35 U.S.C. 154(b) by 0 days.

(21) Appl. No.: 16/149,271

(22) Filed: Oct. 2, 2018

(65) Prior Publication Data

US 2019/0140700 A1    May 9, 2019

(30) Foreign Application Priority Data

Oct. 11, 2017 (DE) .................. 10 2017 123 676

(51) Int. Cl.
*H04B 5/00* (2006.01)
*G06K 19/07* (2006.01)
(Continued)

(52) U.S. Cl.
CPC .......... *H04B 5/0037* (2013.01); *G01D 21/00* (2013.01); *G06F 1/30* (2013.01); *G06F 3/0604* (2013.01);
(Continued)

(58) Field of Classification Search
CPC .... H04B 5/0037; H04B 5/0081; G06F 3/0604
(Continued)

(56) References Cited

U.S. PATENT DOCUMENTS

2005/0116544 A1* 6/2005 Hamel ................ B60C 23/0411
307/46
2008/0281298 A1   11/2008 Andersen et al.
(Continued)

FOREIGN PATENT DOCUMENTS

DE          20107113        8/2001
WO        2010151903       12/2010
(Continued)

OTHER PUBLICATIONS

Naderiparizi et al.; "RF-Powered, Backscatter-Based Cameras"; 2017 11th European Conference on Antennas and Propogation (EUCAP); Mar. 2017; 4 pages.
(Continued)

*Primary Examiner* — Ayodeji O Ayotunde
(74) *Attorney, Agent, or Firm* — Lipsitz & McAllister, LLC (57) ABSTRACT

Sensor apparatus (14) is provided, comprising a receiving device (20) by way of which the sensor apparatus (14) is wirelessly suppliable with electrical energy, a transmission device (44) by way of which data are wirelessly transmittable, a sensitive device (26), at least one data processing device (30) which is signal-operatively coupled to the sensitive device (26) and the transmission device (44) and which processes data of the sensitive device (26) and provides edited data as transmission data to the transmission device (44), and a device (52) for an interruption-tolerant operation of the sensor apparatus (14) with respect to the electrical energy supply, wherein the device (52) for an interruption-tolerant operation is realized by hardware and/or software of the sensor apparatus (14).

21 Claims, 3 Drawing Sheets

(51) Int. Cl.
*G06F 3/06* (2006.01)
*G06K 7/10* (2006.01)
*H04Q 9/00* (2006.01)
*G01D 21/00* (2006.01)
*H02J 50/20* (2016.01)
*G06F 1/30* (2006.01)

(52) U.S. Cl.
CPC .......... *G06F 3/0659* (2013.01); *G06F 3/0679* (2013.01); *G06K 7/10366* (2013.01); *G06K 19/0723* (2013.01); *H02J 50/20* (2016.02); *H04B 5/0062* (2013.01); *H04B 5/0081* (2013.01); *H04Q 9/00* (2013.01); *H04Q 2209/47* (2013.01); *H04Q 2209/88* (2013.01)

(58) Field of Classification Search
USPC ................................................ 455/41.1, 90.2
See application file for complete search history.

(56) References Cited

U.S. PATENT DOCUMENTS

2015/0303975 A1* 10/2015 Calhoun .............. H04B 1/1607
 455/73
2016/0252938 A1 9/2016 Oishi

FOREIGN PATENT DOCUMENTS

WO 2014070254 5/2014
WO 2016108888 7/2016

OTHER PUBLICATIONS

Digiampaolo et al.; "An RFID-Enabled Wireless Strain Gauge Sensor for Static and Dynamic Structural Monitoring"; IEEE Sensors Journal, vol. 17, No. 2; Jan. 15, 2017; pp. 286-294.
Sample et al.; "Design of an RFID-Based Battery-Free Programmable Sensing Platform"; IEEE Transactions on Instrumentation and Measurement, vol. 57, No. 11; Nov. 2008; pp. 2608-2615.
Naderiparizi et al.; "WISPCam: A Battery-Free RFID Camera"; 2015 IEEE International Conference on RFID (RFID); Apr. 2015; 8 pages.
Colin et al.; "Chain: Tasks and Channels for Reliable Intermittent Programs"; OOPSLA 2016 Proceedings of the 2016 ACM SIGPLAN International Conference on Object-Oriented Programming; Oct. 2016; pp. 514-530.
Lucia et al.; "A Simpler, Safer Programming and Execution Model for Intermittent Systems"; PLDI '15 Proceedings of the 36th ACM SIGPLAN Conference on Programming Language Design and Implementation; Jun. 2015; pp. 575-585.
Naderiparizi et al.; "Self-Localizing Battery-Free Camera"; UbiComp '15 Proceedings of the 2015 ACM International Joint Conference on Pervasive and Ubiquitous Computing; Sep. 2015; pp. 445-449.

* cited by examiner

SENSOR APPARATUS, SENSOR SYSTEM, AND METHOD FOR OPERATING A SENSOR APPARATUS

The present disclosure relates to the subject matter disclosed in German application number 10 2017 123 676.7 filed on Oct. 11, 2017, which is incorporated herein by reference in its entirety and for all purposes.

BACKGROUND OF THE INVENTION

The invention relates to a sensor apparatus (sensor device).

The invention further relates to a sensor system, comprising a write and/or read head and at least one sensor apparatus.

Furthermore, the invention relates to a method for operating a sensor apparatus.

WO 2016/108888 A1 discloses a temperature data logger.

WO 2014/070254 A1 discloses a body temperature logger.

WO 2010/151903 A1 discloses a closure mechanism for a container door.

The article "RF-Powered, Backscatter-Based Cameras" by S. Naderiparizi, Z. Kapetanovic, J. R. Smith, deals with apparatuses which have an RF-energy supply.

The article "An RFID-Enabled Wireless Strain Gauge Sensor for Static and Dynamic Structural Monitoring" by E. DiGiampaolo, A. DiCarlofelice and A. Gregori in IEEE SENSORS JOURNAL, VOL. 17, NO. 2, Jan. 15, 2017, pages 286-294 deals with the wireless sensor technology of mechanical voltage measurements.

The article "Design of an RFID-Based Battery-Free Programmable Sensing Platform" by A. P. Sample, D. J. Yeager, P. S. Powledge, A. V. Mamishev, J. R. Smith, in IEEE TRANSACTIONS ON INSTRUMENTATION AND MEASUREMENT, VOL. 57, NO. 11, NOVEMBER 2008, pages 2608-2615 deals with a wireless identification and sensor platform.

The article "WISPCam: A Battery-Free RFID Camera" by S. Naderiparizi, A. N. Parks, Z. Kapetanovic, B. Ransford, J. R. Smith, also deals with such systems.

The article "Chain: Tasks and Channels for Reliable Intermittent Programs" by A. Colin and B. Lucia, OOPSLA Proceedings of the 2016 ACM SIGPLAN International Conference on Object-oriented Programming, pages 514-530 deals with "intermittent computing". The article "A Simpler, Safer Programming and Execution Model for Intermittent Systems" by B. Lucia and B. Ransford, PLDI'15, Jun. 13-17, 2015, Portland, Oreg., USA, pages 575-585 also deals with intermittent computing.

The article "Self-Localizing Battery-Free Cameras" by S. Naderiparizi, A. P. Sample, J. R. Smith, Y. Zhao, J. Youngquist deals with RFID-sensor networks.

SUMMARY OF THE INVENTION

In accordance with an embodiment of the invention, a sensor apparatus is provided which has a secure mode of operation with a large range of variation with respect to the positionability.

In accordance with an embodiment of the invention, a sensor apparatus is provided in which a receiving device is provided by way of which the sensor apparatus is wirelessly providable with electrical energy, a transmission device is provided by way of which data are wirelessly transmittable, a sensitive device is provided, at least one data processing device is provided which is signal-operatively coupled to the sensitive device and the transmission device and which processes data of the sensitive device and provides edited data as transmission data to the transmission device, and a device for an interruption-tolerant operation of the sensor apparatus with respect to the electrical energy supply is provided, wherein the device for an interruption-tolerant operation is realized by hardware and/or software of the sensor apparatus.

The sensor apparatus in accordance with an embodiment of the invention may be freely positioned, as both the energy supply and the data transmission occur wirelessly. Thus, no wire connections and the like are required.

A data processing for data of the sensitive device occurs at (in) the sensor apparatus itself. As a result, certain "finished" or "finalized" measurement data may be transmitted which may be gathered from the source data of the sensitive device and in particular be prepared such that they are directly useable. In turn, the data traffic of the sensor apparatus may thus be minimized and said sensor apparatus may be operated in an energy-saving manner.

Provided in the sensor apparatus itself are primary sensor signals which are poorly transmittable. Processed, compressed sensor data, which may be easily transmitted, arise through the data processing.

In the RFID-sensor systems known from the prior art, there is a large amount of sensor signals to be transmitted. This causes a long transmission time. Furthermore, only a small amount of energy may be transmitted. This means, in turn, in the case of such systems that energy temporarily stored at a sensor is often not sufficient to transmit the large amount of sensor signals in a single step. The transmission stops when a boundary is exceeded and can only be continued when enough energy has been gathered. An interrupted operation then occurs. Because it is provided in accordance with an embodiment of the invention that sensor data which have already been processed and compressed are transmitted and the amount of the transmission signals thereby significantly reduced, the transmission time may be reduced and the amount of energy necessary for the transmission may be reduced. The sensor apparatus in accordance with an embodiment of the invention is well suited to transmit data and energy based on RFID-technology.

In particular, the sensor apparatus may be operated in a battery-less manner and thereby operated without an electrochemical battery cell.

A device for an interruption-tolerant operation of the sensor apparatus with respect to the electrical energy supply and in particular for an interruption-tolerant data processing is provided, which prevents an irretrievable data loss in the case of insufficient electrical energy supply of the sensor apparatus, and in particular enables a continuing operation after restoring a sufficient electrical energy supply. Thus even in the case of insufficient internal electrical energy supply of the sensor apparatus, an "interruption operation" may be reached in which the state before the interruption is temporarily stored, such that a continuation after restoring the internal electrical power supply is made possible. The sensor apparatus uses "intermittent computing" in order to avoid an irretrievable data loss in the case of insufficient internal electrical power supply. Therefore, no permanent internal power supply needs to be ensured for the sensor apparatus for secure functioning, but rather power outages (in particular due to discharging of the electrical energy storage device) are tolerable for the functioning, as a continuing operation is made possible. Operation modes for an interruption-tolerant operation (for "intermittent operation")

are described in the aforementioned articles by A. Colin, B. Lucia and B. Lucia, B. Ransford, respectively. Reference is made explicitly to said articles.

The device for an interruption-tolerant operation may be achieved by way of a hardware solution and/or by way of a software solution of the sensor apparatus. A combination of both a hardware solution and a software solution is possible.

In particular, the sensor apparatus comprises at least one of the following components: a non-volatile data storage device which is signal-operatively connected to the data processing device and/or the sensitive device and/or the transmission device, an energy storage device which is coupled to the receiving device, a measuring device for determining an energetic load state of the energy storage device. Data and in particular also intermediate data may be stored in a non-volatile manner by the data processing device. This enables in particular an interruption-tolerant operation of the sensor apparatus. If a sufficient internal power supply is ensured, then the data storage device may be used to store intermediate states of the sensor apparatus, such that a continuing operation is possible after restoring a sufficient electrical energy supply, without data getting lost. The energy storage device may be used to store energy which has been received by the receiving device. The measuring device may be used to determine an electrical load state of the energy storage device. As a result, it can be recognized, e.g., if a certain sub-threshold is reached in order to provide for a temporary storage of the data.

It is favorable if the energy storage device comprises at least one capacitor. The sensor apparatus may thereby be configured with small dimensions. An electrostatic energy storage takes place and in particular no electrochemical energy storage is necessary.

It is favorable if electrical energy is transmittable to the sensor apparatus by way of an air gap and is receivable by the receiving device, and data are transmittable by way of an air gap from the sensor apparatus and in particular data are receivable by the sensor apparatus by way of an air gap. Both a wireless energy supply and a wireless data transmission (bidirectional or unidirectional) may be achieved. The air gap is, for example in the case of an inductive energy transmission, a few centimeters large. In the case of an electromagnetic transmission, it may be a few meters.

Provision is advantageously made for the receiving device for electrical energy to be configured to receive inductively transmitted electrical energy and/or to receive electrical energy transmitted by way of electromagnetic waves. Electrical energy may thus be transmitted wirelessly in a simply manner.

Provision may be made in particular for the data processing device and/or the device for an interruption-tolerant operation to be realized on a microcontroller.

In one embodiment, the device for an interruption-tolerant operation specifies breakpoints which characterize a state of the sensor apparatus in operation and which secure said state in the case of insufficient energy supply of the sensor apparatus, wherein in the case of sufficient energy supply after previously insufficient energy supply, a continuation of the operation of the sensor apparatus and in particular a continuation of the data processing of data of the sensitive device is enabled due to stored breakpoint data. Said breakpoints and the associated breakpoint data may then allow a continuation of a sensor operation without irretrievable data losses after restoring a sufficient power supply following an interval with an insufficient power supply.

In particular, a storage of breakpoint data at a non-volatile data storage device is provided, such that an interruption-tolerant continuing operation is made possible.

It may hereby be favorable for breakpoint data to be redundantly stored and in particular stored multiple times. Thus, for example, a power outage during a storage operation may not lead to permanent data losses.

In one embodiment, a measuring device for determining an energetic load state of an energy storage device of the sensor apparatus is associated with the device for an interruption-tolerant operation, and the device for an interruption-tolerant operation, in particular upon reaching a sub-threshold for an energetic load state of the energy storage device, provided for the storage of breakpoints. To a certain extent, it is then monitored if a critical state of the energy storage device is reached and the necessary data set is then stored, such that if the critical state is exceeded (which means that an insufficient power supply is present) no irretrievable data losses occur.

It is alternatively or additionally possible for the device for an interruption-tolerant operation to provide for the storage of breakpoint data of an operating program (operating system) for the operation of the sensor apparatus. Thus, in particular, a purely software solution for the device for an interruption-tolerant operation may be realized, wherein the device then has a minimal electrical energy requirement.

For example, it is also possible for the device for an interruption-tolerant operation to ensure that an operating program is divided into working steps which are consecutively executable multiple times, and thereby in particular deliver the same result as in the case of a single execution. An interruption tolerance may thus be achieved.

In particular, the working steps are such that input data and output data are separate. Said data is transmitted, e.g., via channels which are accessible for all working steps. As a result, data inconsistencies may be avoided.

It is favorable if the sensor apparatus has a housing in which components and in particular all components of the sensor apparatus are arranged. A sensor apparatus thus arises which is positionable in a simple manner at an application and, e.g., may also be moveably positioned (because it is wireless).

It is particularly advantageous if processed data are sent by the transmission device, which data are directly useable sensor data. Said data then in particular do not need to be further processed outside of the sensor apparatus. As a result, the data transfer of the sensor apparatus may be kept minimized, as only "finished" data and not a plurality of intermediate data is transmitted.

It is favorable if the transmission device transmits data in accordance with an RFID-protocol. This results in a simple usability and ability to be further processed. Provision is further made in particular for energy to be transmitted to a sensor apparatus via an RFID-protocol. Thus, known RFID-technologies may be used. In accordance with an embodiment of the invention, disadvantages of known RFID-sensor systems, and in particular a large amount of the sensor signals to be transmitted, may be reduced, as finished, processed, and also compressed sensor data are transmitted by the data processing device, and thereby fewer interruptions occur upon transmission as in known RFID-sensor systems. Interruptions, in turn, may be compensated for by the device for an interruption-tolerant operation.

The receiving device may thereby be configured to receive data. As a result, control data, for example, may be transferred to the sensor apparatus.

A receiving device which is separate from the receiving device for wireless energy supply may also be provided for such reception data.

In particular, the sensor apparatus is configured to be battery-less, i.e. it works in a battery-less manner. This results in a high use variability. This further results in reduced maintenance and an increase in uptime, as no battery exchange is necessary.

In accordance with an embodiment of the invention, a sensor system is provided which comprises (at least) one write and/or read head and at least one sensor apparatus in accordance with an embodiment of the invention, wherein the write and/or read head wirelessly provides electrical energy to the at least one sensor apparatus.

As a result, the at least one sensor apparatus may be positioned at an application. Electrical energy may be constantly provided by the write and/or read head or electrical energy may be provided only temporarily and, e.g., periodically to the sensor apparatus by the write and/or read head.

Provision may thereby be made for the write and/or read head to be configured only as a read head which (in addition to providing energy) receives data of the at least one sensor apparatus (and in particular edited data) or is configured only as an transmitting head which (in addition to providing energy) provides data to the at least one sensor apparatus, or has both a reading function and a writing function.

In accordance with an embodiment of the invention, a method for operating a sensor apparatus is provided in which electrical energy is wirelessly provided to the sensor apparatus, data of a sensitive device are processed in the sensor apparatus, processed data are wirelessly sent from the transmitting apparatus, and it is operated in an interruption-tolerant manner with respect to an electrical energy supply, wherein a state of the sensor apparatus is stored in which a data processing operation is continued in the case of sufficient electrical energy supply after a state with insufficient electrical energy supply.

No wire connection, e.g., between a write and/or read head and the sensor apparatus needs to be provided. This results in a great freedom for the positionability of the sensor apparatus at an application.

By transmitting processed data, the data transfer from the sensor apparatus may be kept small. To a certain extent, no intermediate data needs to be sent for further processing. In turn, the sensor apparatus may thus be operated in an energy-saving manner.

In particular, it may be operated without an (electrochemical) battery.

In particular, no irretrievable data losses occur by entering a state of insufficient electrical energy supply of the sensor apparatus. In a corresponding operation with "intermittent computing", interruptions in the electrical power supply are harmless with respect to data losses. For example, after restoring an electrical energy supply, a data processing in the sensor apparatus may be continued. In particular, measured data are not lost. This results in (sensor) data having a simple usability and ability to be further processed.

BRIEF DESCRIPTION OF THE DRAWINGS

The subsequent description of preferred embodiments serves in conjunction with the drawings for further explanation of the invention. In the drawings.

DETAILED DESCRIPTION OF THE INVENTION

Figure 1:
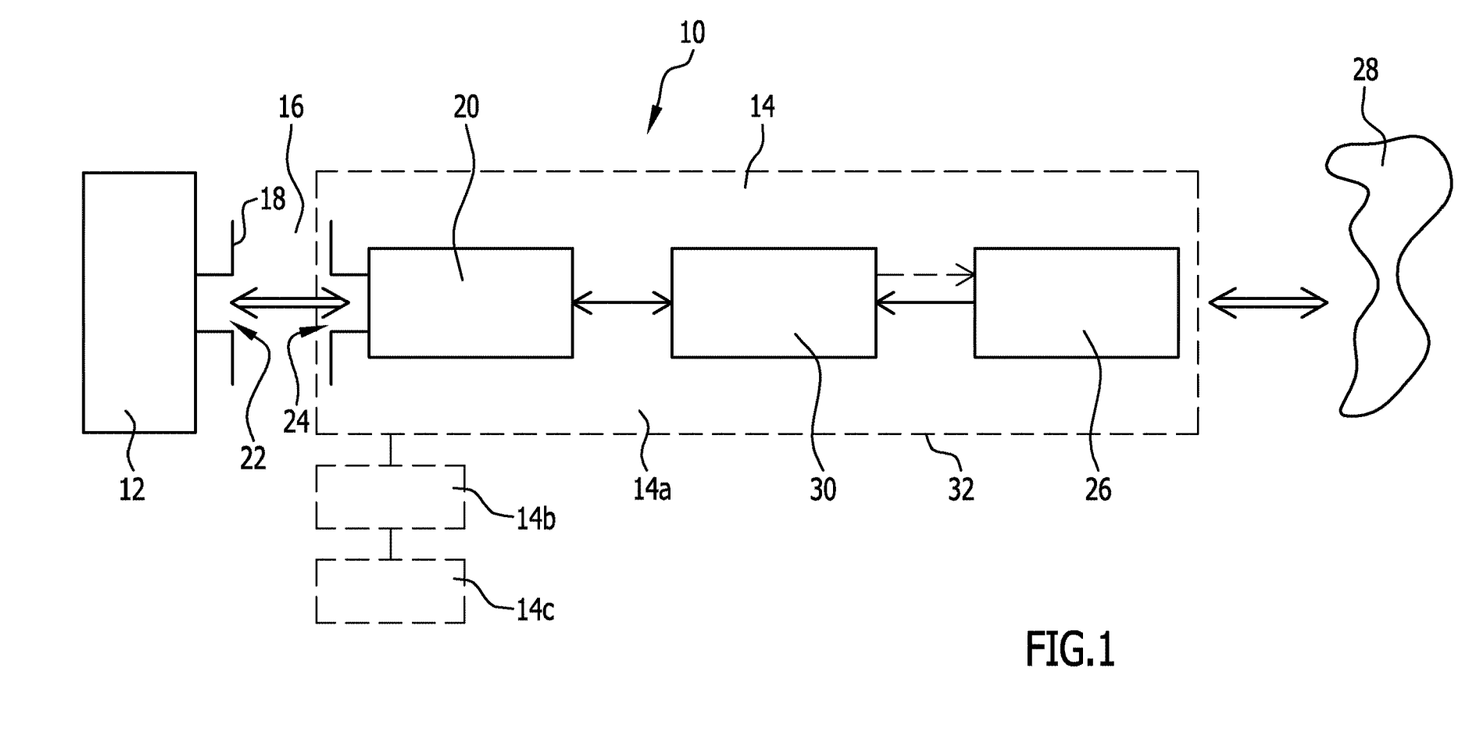
FIG. 1 shows a schematic view of an embodiment of a sensor system with a write and/or read head (transmitting and/or read-write and/or read head) and a plurality of sensor apparatuses.

An embodiment of a sensor system 10 in accordance with an embodiment of the invention, which is schematically shown in FIG. 1, comprises a write and/or read head 12 and at least one sensor apparatus 14. In the embodiment shown in FIG. 1, multiple sensor apparatuses 14a, 14b, 14c, etc. are associated with the write and/or read head 12.

In principle, the sensor system 10 may also comprise multiple heads 12.

The write and/or read head 12 serves for the wireless energy supply of one or more sensor apparatuses 14 through an air gap 16. The write and/or read head 12 provides electrical energy to a sensor apparatus 14, in particular inductively or by way of electromagnetic waves.

The energy supply of the corresponding sensor apparatus 14 by way of the write and/or read head 12 is wireless.

A write and/or read head 12 correspondingly has a transmission device 18 for electrical energy. A sensor apparatus 14 has a receiving device 20 for electrical energy which is associated with the transmission device 18.

Figure 3:
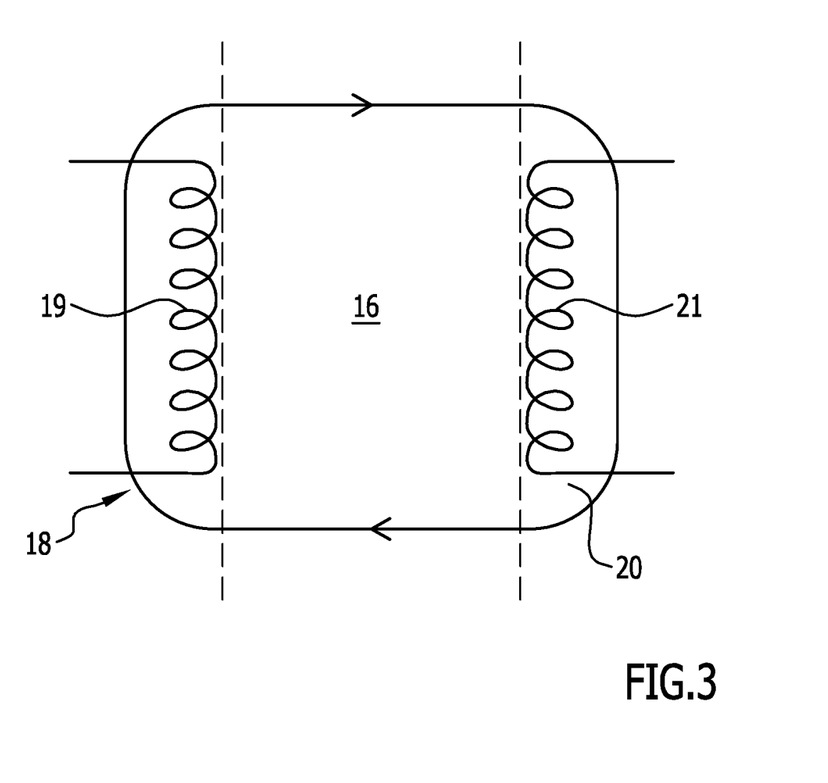
FIG. 3 shows a schematic view of an embodiment of a receiving device for electrical energy of a sensor apparatus coupled to a corresponding transmission device for electrical energy of a write and/or read head.

In one embodiment, the transmission device 18 (FIG. 3) is formed by one or more spools 19 and the receiving device 20 is formed by one or more spools 21. Correspondingly, electrical energy may be inductively transmitted through the air gap 16.

For example, it is also possible for the transmission device 18 to be formed by an antenna and the receiving device 20 to be formed by an antenna (indicated in FIG. 1 by the reference numerals 22 and 24, respectively).

Correspondingly, electrical energy is then transmitted through the air gap by means of electromagnetic waves.

The write and/or read head 12 may also have a reading function in addition to the energy provision in order to receive data from sensor apparatuses 14.

It may additionally or alternatively have a transmission function for data in order to transmit data to a corresponding sensor apparatus 14. The data transmission between the write and/or read head 12 and the sensor apparatus 14 hereby occurs wirelessly through the air gap 16.

Figure 2:
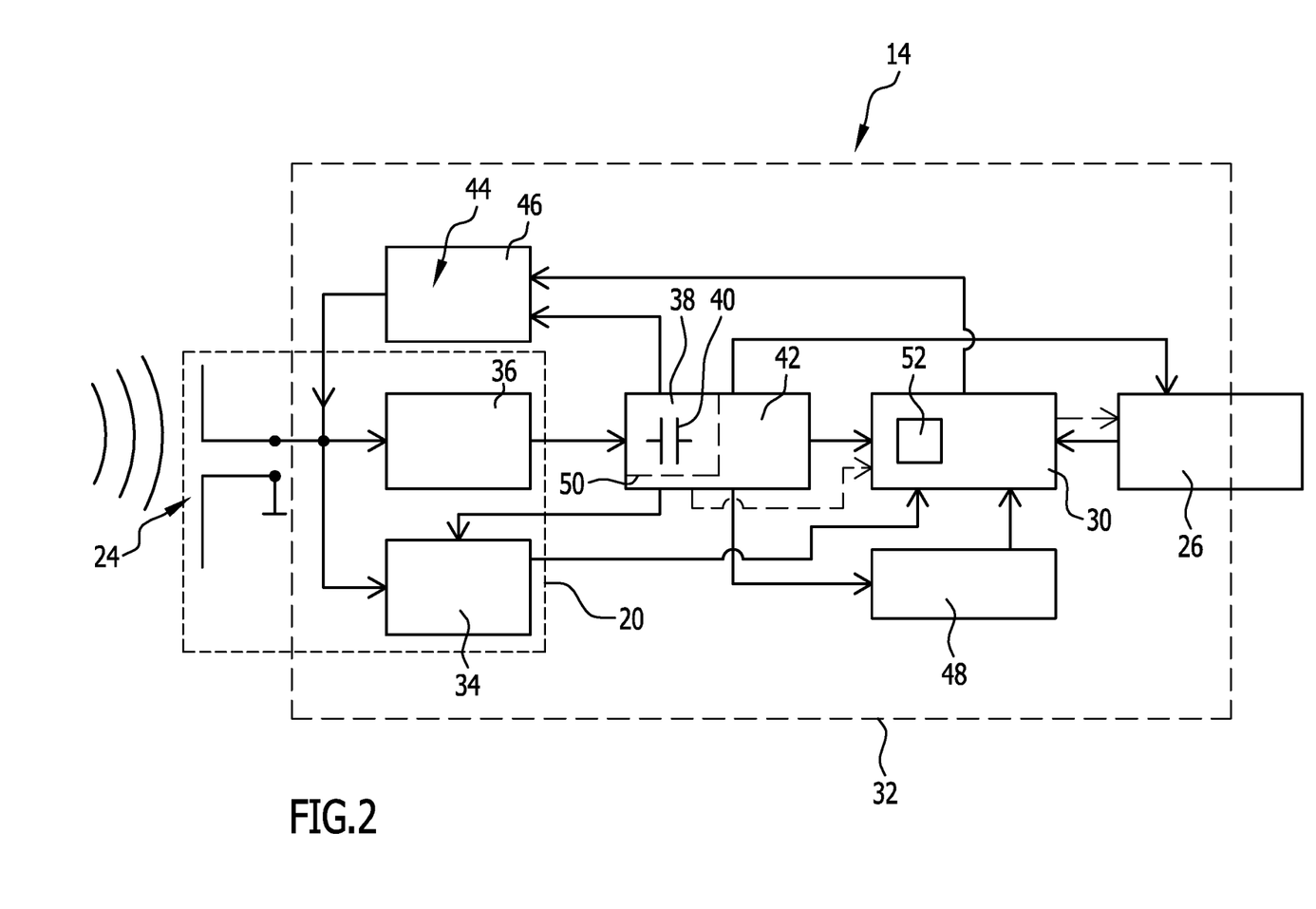
FIG. 2 shows a schematic depiction of an embodiment of a sensor apparatus.

A sensor apparatus 14 comprises a sensitive device 26. The sensitive device 26 comprises one or more sensor elements (measuring probes) which, for example, are able to detect certain physical and/or chemical properties and/or the material composition of a vicinity of the sensor apparatus 14. The sensitive device 26 generates electrical signals with can be further processed and which characterize precisely these properties.

The "vicinity" is indicated in FIG. 1 with the reference numeral 28.

The sensitive device 26 comprises, e.g., one or more temperature sensor elements, one or more moisture sensor elements, one or more acceleration sensor elements, one or more inclination sensor elements, one or more proximity sensor elements, one or more capacitive proximity sensor elements, one or more optical sensor elements, one or more reed switches, one or more magnetic sensor elements, one or more cameras, one or more biologically active sensor elements, one or more chemical sensor elements, etc.

A sensor apparatus 14 further comprises a data processing device 30. The data processing device 30 is signal-operatively coupled to the sensitive device 26. The sensitive device 26 provides its signals to the data processing device 30. The data processing device 30 processes the data of the sensitive device 26. Data processed by data processing are provided by the data processing device 30, which data can then be transmitted by a transmission device of the sensor apparatus 14 to the write and/or read head 12 (see below).

A sensor apparatus 14 wirelessly transmits sensor data to the write and/or read head 12. The sensor data are in particular such data which are directly derived from measurement values and are processable. It is prepared data which is in particular useable.

As a result, the sensor apparatus 14 may be operated in an energy-saving manner, as the data transmission for data gathered from the sensitive device 26 may be minimized. To a certain extent, "finished" measurement values, namely finished, preprocessed, compressed sensor data are sent from the sensor apparatus 14 to the write and/or read head 12 and not intermediate signals ("primary sensor signals") which need to be processed in the write and/or read head 12 or another evaluation device. In the case of unprocessed ("primary") signals, in comparison to the provision made in accordance with an embodiment of the invention, the data flow is much higher and thus also the energy consumption for the data transmission.

A sensor apparatus 14 comprises a housing 32 in which the components of the sensor apparatus 14 and in particular the receiving device 20, the data processing device 30, and the sensitive device 26 are arranged, as a well as further components as described below.

The sensor apparatus 14 is an apparatus which is positionable at a distance from the write and/or read head 12 and to which electrical energy is wirelessly provided by the write and/or read head 12 for its operation. A sensor apparatus 14 is thus a self-sufficient apparatus which wirelessly provides preprocessed, compressed sensor data to the write and/or read head 12.

The sensor apparatus 14 is in particular operated in a battery-less manner, i.e. it is operated in particular not with an electrochemical battery.

The receiving device 20 comprises, e.g., an antenna 24. Further, a demodulator 34 may be provided which demodulates received signals. The receiving device 20 is then both a receiving device for electrical energy and for data.

Demodulated signals are provided by the demodulator 34 in particular to the data processing device 30, which is signal-operatively connected to the demodulator 34 for that purpose.

Provision may thereby be made for the receiving device 20 to comprise a rectifier 36 which provides for a rectification of the electrical energy supply voltage.

Further, an electrical energy storage device 38 is provided which is electrically coupled to the receiving device 20 and in particular to the rectifier 36. The electrical energy storage device 38 may store electrical energy. It is electrically loadable by way of the receiving device 30 and thereby by the energy wirelessly transmitted by way of the air gap 16.

In one embodiment, the electrical energy storage device 38 comprises one or more capacitors 40 which are accordingly chargeable.

A voltage regulator and/or voltage transformer 42 may be provided, which is coupled to the data processing device 30.

The electrical energy storage device 38 supplies the components of the sensor apparatus 14 with electrical energy.

A transmission device 44 is provided which can wirelessly transmit data, e.g., to the write and/or read head 12 by way of the antenna 24. The transmission device 44 is signal-operatively coupled to the data processing device 30. The data processing device 30 provides data to the transmission device 44, which are then transmittable by the sensor apparatus 14.

A modulator 46 is provided which is associated with the transmission device 44 or is part thereof, and which modulates data provided by the data processing device 30, such that they are transmittable by the transmission device 44, i.e. through the air gap 16, in particular to the write and/or read head 12.

The electrical energy storage device 38 supplies the modulator 46 and the demodulator 44 with appropriate electrical energy.

Further, a non-volatile data storage device 48 is provided in which data are storable. For this purpose, the data storage device 48 is in signal-operative connection with the data processing device 30. Should it be necessary, the data storage device 48, the data storage device 48 is supplied with electrical energy by way of the electrical energy storage device 38.

In one embodiment, a measuring device 50 for determining an energetic load state of the energy storage device 38 is arranged in the housing 32 of the sensor apparatus 14. This measures how much energy is stored in the electrical energy storage device 38.

The sensor apparatus 14 comprises a device 52 for an interruption-tolerant operation of the sensor apparatus 14. The device 52 is in signal-operative connection with the data processing device 30.

If a measuring device 50 is present, then it is in signal-operative connection with said device 52.

The device 52 may be realized by one or more hardware components and/or by one or more software components of the sensor apparatus 14.

In one embodiment, in particular the data processing device 30 is realized by a microcontroller like a ULP-microcontroller. The device 52 may be integrated in said microcontroller.

It is the task of the device 52 to ensure that, when a state of an insufficient energy supply of the sensor apparatuses 14 is reached, after restoring a state with sufficient energy supply, the sensor apparatus 14 and in particular the data processing at the data processing device 30 may be continued, without irretrievable data losses due to the insufficient energy supply occurring and in particular no measurement data losses due to the energy outage.

The device 52 works according to the principle of "intermittent computing". For example, in the article "Chain: Tasks and Channels for Reliable Intermittent Programs" by A. Colin and B. Lucia, OOPSLA Proceedings of the 2016 ACM SIGPLAN International Conference on Object-oriented Programming, pages 514-530, an intermittent (interruption-tolerant) operation model is described which is based on a "chain"-algorithm.

A further interruption-tolerant system is described in the article "A Simpler, Safer Programming and Execution Model for Intermittent Systems" by B. Lucia and B. Ransford, PLDI'15, Jun. 13-17, 2015, Portland, Oreg., USA, pages 575-585.

Such systems may be used for the device 52.

The device 52 for interruption-tolerant operation 52 protects the sensor apparatus 14 from damaging effects of an energy outage, in the respect that no irretrievable data losses occur, but rather a simple continuation of the operation after sufficient loading of the energy storage device is present.

In one embodiment with the measuring device 50, the load state of the electrical energy storage device 38 is constantly measured. When a certain sub-threshold for the load state is reached, then the necessary state data of the sensor apparatus are stored as breakpoint data in the data storage device 48. Thus, the necessary data are stored in the non-volatile data storage device 48, to a certain extent, shortly before an internal power outage at the sensor apparatus 14.

When sufficient energy is present again, these breakpoint data may be used for continuing the operation, wherein in particular sufficient energy is then also verifiable by way of the measuring device 50.

In this embodiment, by means of the measuring device 50, which also requires electrical energy however, energy-controlled breakpoint data are used, wherein the corresponding breakpoint data are stored in the data storage device 48. This method is also referred to as "energy guided checkpointing". It requires the measuring device 50 as hardware.

It is also possible in principle for the device 52 to function on operating program level of the sensor apparatus 14 alone, and in particular for program breakpoints to be generated with corresponding program holding data.

In one embodiment, an operating program of the sensor apparatus 14 is executed such that a certain state and in particular data processing state at the data processing device 30 is stored in the data storage device 48 as breakpoint data at certain operating program breakpoints.

In particular, the storage occurs with a certain redundancy. For example, a double buffered storage in the data storage device 48 is provided. As a result, in particular a data loss in the case of an outage of the internal electrical energy supply of the sensor apparatus 14 at the moment of storage may be avoided.

In this case, the device 52 is in particular a subunit of an operating program for the operation of the sensor apparatus 14.

The method with the generation of program breakpoints for an operating program of the sensor apparatus 14 is also referred to as "co-checkpointing" for an interruption-tolerant operation.

In a further embodiment, which is implemented in particular as a purely software solution for the device 52, an operating program of the sensor apparatus 14 is divided into small working steps which are consecutively executable multiple times and have the same result. For this purpose, in particular input data and output data of such working steps are separate from each other. As a result, a data inconsistency may be avoided. In particular, the working steps exchange data with each other by reading input data from channels and writing output data into channels, wherein said channels are preferably accessible in all working steps.

The corresponding method is also referred to as idempotent programming ("idem potent cogeneration").

In principle, the device 52 for the interruption-tolerant operation serves to bridge periods of lacking energy supply (periods of the power outage) for the sensor apparatus 14 in such a way that a continued operation is possible in the case of insufficient power supply in particular of the data processing device 30, and in particular measurement values of the sensitive device 26 which have already been determined are able to be processed further by the data processing device 30 and are not lost.

The transmission device 44 preferably transmits its transmission data in particular with a RFID-protocol like ISO15693, or EPC (electronic product code ISO18000-63).

In accordance with an embodiment of the invention, a sensor system 10 with one or more sensor apparatuses 14 is provided in which a sensor apparatus 14 provides preprocessed, compressed "finished" data ("secondary sensor data") and wirelessly transmits the same, e.g., to the write and/or read head 12. Thus, an energy-saving operation is made possible. In particular, a radio transmission is provided. The data traffic may be minimized, as "finished" preprocessed, compressed sensor data are sent by the sensor apparatus 14.

Due to the radio transmission, a sensor apparatus 14 may be positioned at an application without a wire connection needing to be provided.

The electrical energy supply of a sensor apparatus 14 occurs wirelessly by way of the write and/or read head 12. No electrochemical battery for a sensor apparatus 14 needs to be provided.

Electrical energy may be transmitted from the write and/or read head 12 to the sensor apparatus 14 if they are at a certain minimum spacing from each other. For example, even in the case of a relative movement between the write and/or read head 12 and one or more sensor apparatuses 14, an electrical energy supply of the sensor apparatus 14 or sensor apparatuses 14 may be ensured. Said energy supply may be periodic, for example.

The device 52 for an interruption-tolerant operation thereby ensures that, in periods with lacking internal power supply of a sensor apparatus 14, no data losses occur, but rather only the data processing activity and transmission activity of a sensor apparatus 14 is interrupted. After restoring a sufficient electrical energy supply (if, for example, the write and/or read head 12 has entered into the vicinity of a sensor apparatus 14 and electrical energy has been transmitted to the receiving device 20 and from there to the electrical energy storage device 38), in particular the data processing at the data processing device 30 and also the measurement value evaluation at the sensitive device 26 may be continued. The state of the sensor apparatus 14 prior to the outage of the electrical energy supply is stored by way of the device 52 and particularly enables a continuation by using the previously present data and, for example, by using previously determined measurement values.

For example, the sensor apparatus may be arranged on a rotating part like, e.g., a shaft or a turntable. The sensor apparatus may be arranged, e.g., in a tank as for liquid or loose material. Data and energy, respectively, may then be transmitted, e.g., through a wall or a window. The sensor apparatus may be arranged in a clean room or in a vacuum chamber. The write and/or read head may be arranged outside of the clean room and the vacuum chamber, respectively. The sensor apparatus may be arranged at places which are not easily accessible, to which no cable is able to be run.

REFERENCE NUMERAL LIST 10 sensor system
12 write and/or read head
14a, b, c sensor apparatus
16 air gap
18 transmission device
19 spool
20 receiving device
21 spool 22 antenna
24 antenna
26 sensitive device
28 "vicinity"
30 data processing device
32 housing
34 demodulator
36 rectifier
38 electrical energy storage device
40 capacitor
42 voltage regulator and/or voltage transformer
44 transmission device
46 modulator
48 data storage device
50 measuring device
52 device for interruption-tolerant operation

What is claimed is:

1. Sensor apparatus, comprising:
   a receiving device by way of which the sensor apparatus is wirelessly suppliable with electrical energy;
   a sensitive device comprising one or more sensor elements each configured as a measuring probe;
   at least one data processing device which is signal-operatively coupled to the sensitive device which processes data of the sensitive device and provides edited data for transmission;
   a transmission device coupled to the at least one data processing device by way of which the edited data are wirelessly transmittable; and
   a device for an interruption-tolerant operation of the sensor apparatus with respect to the electrical energy supply;
   wherein:
   the device for an interruption-tolerant operation of the sensor apparatus is a device for an interruption-tolerant data processing which prevents an irretrievable data loss in the case of insufficient electrical energy supply of the sensor apparatus;
   the device for an interruption-tolerant operation is realized by at least one of hardware and software of the sensor apparatus; and
   at least one of the at least one data processing device and the device for an interruption-tolerant operation are realized on a microcontroller.

2. Sensor apparatus in accordance with claim 1, comprising at least one of the following components:
   a non-volatile data storage device which is signal-operatively connected to at least one of the at least one data processing device, the sensitive device, and the transmission device;
   an energy storage device which is coupled to the receiving device;
   a measuring device for determining an energetic load state of the energy storage device.

3. Sensor apparatus in accordance with claim 2, wherein the energy storage device comprises at least one capacitor.

4. Sensor apparatus in accordance with claim 1, wherein electrical energy is transmitted to the sensor apparatus by way of an air gap and is receivable by the receiving device, and wherein data is transmittable from the sensor apparatus by way of an air gap.

5. Sensor apparatus in accordance with claim 1, wherein the receiving device for electrical energy is configured to at least one of (i) receive inductively transmitted electrical energy, and (ii) receive electrical energy transmitted by way of electromagnetic waves.

6. Sensor apparatus in accordance with claim 1, wherein the device for an interruption-tolerant operation specifies breakpoints which characterize a state of the sensor apparatus in operation and which secure said state in the case of insufficient energy supply of the sensor apparatus, wherein in the case of sufficient energy supply after previously insufficient energy supply, a continuation of the operation of the sensor apparatus and in particular a continuation of the data processing of data of the sensitive device is enabled due to stored breakpoint data.

7. Sensor apparatus in accordance with claim 6, wherein a storage of breakpoint data at a non-volatile data storage device is provided.

8. Sensor apparatus in accordance with claim 6, wherein breakpoint data is stored redundantly and in particular stored multiple times.

9. Sensor apparatus in accordance with claim 1, wherein a measuring device for determining an energetic load state of an energy storage device of the sensor apparatus is associated with the device for an interruption-tolerant operation, and the device for an interruption-tolerant operation provides for the storage of breakpoint data.

10. Sensor apparatus in accordance with claim 1, wherein the device for an interruption-tolerant operation provides for the storage of breakpoint data of an operating program for the operation of the sensor apparatus.

11. Sensor apparatus in accordance with claim 1, wherein the device for an interruption-tolerant operation provides for an interruption-tolerant operation in which an operating program is divided into working steps which are consecutively executable multiple times and thereby deliver the same result as in the case of a single execution.

12. Sensor apparatus in accordance with claim 11, wherein the working steps are such that input data and output data are separate.

13. Sensor apparatus in accordance with claim 1, wherein there is a housing in which components of the sensor apparatus are arranged.

14. Sensor apparatus in accordance with claim 1, wherein the edited data sent by the transmission device, are directly useable sensor signals.

15. Sensor apparatus in accordance with claim 1, wherein the transmission device transmits the edited data in accordance with an RFID-protocol.

16. Sensor apparatus in accordance with claim 1, wherein the receiving device is configured to receive data.

17. Sensor apparatus in accordance with claim 1, wherein there is a battery-less configuration.

18. Sensor system, comprising a write and/or read head and at least one sensor apparatus, said sensor apparatus comprising:
   a receiving device by way of which the sensor apparatus is wirelessly suppliable with electrical energy;
   a sensitive device comprising one or more sensor elements each configured as a measuring probe;
   at least one data processing device which is signal-operatively coupled to the sensitive device which processes data of the sensitive device and provides edited data for transmission;
   a transmission device coupled to the at least one data processing device by way of which the edited data are wirelessly transmittable; and
   a device for an interruption-tolerant operation of the sensor apparatus with respect to the electrical energy supply;
   wherein:

the device for an interruption-tolerant operation of the sensor apparatus is a device for an interruption-tolerant data processing which prevents an irretrievable data loss in the case of insufficient electrical energy supply of the sensor apparatus;

the device for an interruption-tolerant operation is realized by at least one of hardware and software of the sensor apparatus;

at least one of the at least one data processing device and the device for an interruption-tolerant operation are realized on a microcontroller; and the write and/or read head wirelessly provides electrical energy to the at least one sensor apparatus.

19. Sensor apparatus in accordance with claim 18, wherein the write and/or read head is configured as a read head which receives data of the at least one sensor apparatus, is configured as a transmitting head which provides data to the at least one sensor apparatus, or is configured as a write and/or read head.

20. Method for operating a sensor apparatus in which electrically energy is wirelessly provided to the sensor apparatus, data of a sensitive device are processed in the sensor apparatus, and processed data are wirelessly sent by the sensor apparatus, comprising:

operating the sensor apparatus in an interruption-tolerant manner with respect to an electrical energy supply;

wherein a state of the sensor apparatus is stored in which, in the case of sufficient electrical energy supply after a state with insufficient electrical energy supply, a data processing operation is continued.

21. Method in accordance with claim 20, wherein no irretrievable data losses occur by entering a state of an insufficient electrical energy supply of the sensor apparatus.

* * * * *